(12) United States Patent
Yi et al.

(10) Patent No.: US 7,739,414 B2
(45) Date of Patent: Jun. 15, 2010

(54) USER INTERFACE CONVERSION SYSTEM AND METHOD CAPABLE OF SUPPORTING VARIOUS DEVICES

(75) Inventors: Kyounghoon Yi, Seoul (KR); Saerin Kim, Seoul (KR); Minseok Lee, Pohang (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1219 days.

(21) Appl. No.: 10/725,432

(22) Filed: Dec. 3, 2003

(65) Prior Publication Data

US 2004/0146057 A1    Jul. 29, 2004

(30) Foreign Application Priority Data

Jan. 28, 2003    (KR) .................. 10-2003-0005568

(51) Int. Cl.
    *G06F 15/16*    (2006.01)
(52) U.S. Cl. .................. 709/250; 709/201; 709/203; 709/223; 709/224
(58) Field of Classification Search .................. 715/734, 715/744, 746; 709/223, 220, 219, 250, 243, 709/201, 203, 224
See application file for complete search history.

(56) References Cited

U.S. PATENT DOCUMENTS

| | | | |
|---|---|---|---|
| 6,615,088 B1 * | 9/2003 | Myer et al. | 700/20 |
| 2002/0129096 A1 * | 9/2002 | Mansour et al. | 709/203 |
| 2003/0009537 A1 * | 1/2003 | Wang | 709/219 |
| 2003/0126293 A1 * | 7/2003 | Bushey | 709/246 |
| 2005/0267935 A1 * | 12/2005 | Gandhi et al. | 709/203 |

* cited by examiner

*Primary Examiner*—Djenane M Bayard
(74) *Attorney, Agent, or Firm*—Sughrue Mion, PLLC

(57) ABSTRACT

The present invention relates to a user interface conversion system and method capable of supporting various devices. The user interface conversion system includes a control device for controlling predetermined devices residing on a home network, and a gateway for generating an integrated user interface based on neutral user interfaces of the devices residing on the home network at the request of a user for controlling the devices and converting the generated user interface into a specific user interface so that the integrated user interface can be supported in a specific client of the user.

17 Claims, 3 Drawing Sheets

USER INTERFACE CONVERSION SYSTEM AND METHOD CAPABLE OF SUPPORTING VARIOUS DEVICES

This application claims the priority of Korean Patent Application No. 10-2003-0005568, filed on Jan. 28, 2003, in the Korean Intellectual Property Office, the disclosure of which is incorporated herein in its entirety by reference.

BACKGROUND OF THE INVENTION

1. Field of the Invention

The present invention relates to a user interface conversion system and method capable of supporting various devices, and more particularly, to a user interface conversion system and method capable of supporting various devices wherein an integrated user interface is generated based on neutral user interfaces residing on the home network and converted into a specific user interface such that the integrated user interface can be supported in a client. This application claims the priority of Korean Patent Application No. 10-2003-0005568, filed on Jan. 28, 2003, in the Korean Intellectual Property Office, the disclosure of which is incorporated herein in its entirety by reference.

2. Description of the Related Art

In general, a home network is configured using Internet Protocol (hereinafter referred to as "IP") based private networks. Thus, various kinds of equipment used in a home, including all types of personal computers (PCs), intelligent appliances and wireless devices, are connected to one another and controlled through a single network.

A proposed home network system is configured in such a manner that a common virtual computing environment called middleware is established at the equipment residing in the private network and applications are provided on the computing environment. The middleware allows various kinds of equipment to communicate with one another in the home network. The currently available middleware includes home AV interoperability (HAVi), universal plug and play (UPnP), Jini, home wide web (HWW), and the like.

Various kinds of equipment residing on the home network are connected to one another in a peer-to-peer fashion through a home network middleware. The respective equipment uses IP addresses that are assigned by a dynamic host configuration protocol (hereinafter, "DHCP") server or selected by an auto IP function.

That is, when the respective equipment is first connected to the home network, it searches for the DHCP server in order to obtain the address assigned in accordance with a response of the DHCP server or automatically selects the IP address within a certain range using the auto IP function in a case of a network in which the DHCP server does not operate.

The equipment by which the IP address assigned by the DHCP server or selected by the auto IP function is used can communicate with other equipment on the network using TCP/IP and perform searches and queries for the other equipment on the network via the respective IP addresses.

The home network middleware such as the UPnP uses the protocol such as sampling stochastic dynamic programming (hereinafter, "SSDP") in order to search desired equipment in the home network. Further, in order to control the operation of the searched equipment, a web-based method is used in which a simple object access protocol (hereinafter, "SOAP") is used to call a relevant control device or a control message is transmitted through a presentation web page.

FIG. 3 illustrates an operation control process of accessing the UPnP control device residing in the conventional home network.

As shown in FIG. 3, a UPnP control point 30 searches for control devices such as the control device 20 for controlling various kinds of equipment on the UPnP home network (hereinafter, "UPnP CD") using the SSDP and controls the UPnP CD 20 through a SOAP request using device information on the searched UPnP CD 20 obtained from the search of the UPnP CDs 20 using the SSDP. That is, the UPnP control point 30 controls the equipment by calling the UPnP CD 20.

Alternatively, the UPnP control point 30 accesses a relevant control web page of the UPnP CD 20 through a web browser 10 using current uniform resource locator (URL) information corresponding to the control web page of the searched UPnP CD 20 obtained from the search of the UPnP CDs 20 using the SSDP. Then, the control point transmits an HTTP request corresponding to a control message for controlling specific equipment through the control web page provided on the web browser 10 to the UPnP CD 20, and thus, confirms processing results for the HTTP request in the UPnP CD 20. That is, if a user has access to the control web page of the UPnP CD 20 through the web browser 10 and selects a desired control message, an HTTP request message corresponding to the selected control message is transmitted to the UPnP CD 20. Then, the process for the HTTP request is performed at the UPnP CD 20 and its resultant response is received by the user.

However, there is a problem in that devices such as mobile phones or PDAs, which recently gained wide public exposure but have limited computer performance and UI display capability, have difficulty in properly executing the web browser or displaying the HTML pages as they are.

Further, there is another problem in that the devices on the home network cannot be controlled in a case where the protocols supporting the middleware are not compatible with one another even though the middleware should be used for searching and controlling the device operating on the home network.

SUMMARY

The present invention is conceived to solve the aforementioned problems. An object of the present invention is to provide a user interface conversion system and method capable of supporting various devices, wherein an integrated user interface is generated based on neutral user interfaces for the devices and converted into a specific user interface for allowing the integrated user interface to be supported in a specific client, thereby enabling the support of various clients.

Another object of the present invention is to provide a user interface conversion system and method capable of supporting various devices, for enabling the access to devices on a home network through an integrated user interface.

According to an aspect of the present invention for achieving the objects, there is provided a user interface conversion system comprising a control device for controlling predetermined devices residing on a home network, and a gateway for generating an integrated user interface based on neutral user interfaces of the devices residing on the home network at the request of a user for controlling the devices and converting the generated user interface into a specific user interface so that the integrated user interface can be supported in a specific client of the user.

BRIEF DESCRIPTION OF THE DRAWINGS

The above and other objects, features and advantages of the present invention will become apparent from the following description of an exemplary embodiment given in conjunction with the accompanying drawings, in which.

DESCRIPTION

Hereinafter, an exemplary embodiment of the present invention will be explained in detail with reference to the accompanying drawings.

Figure 1:
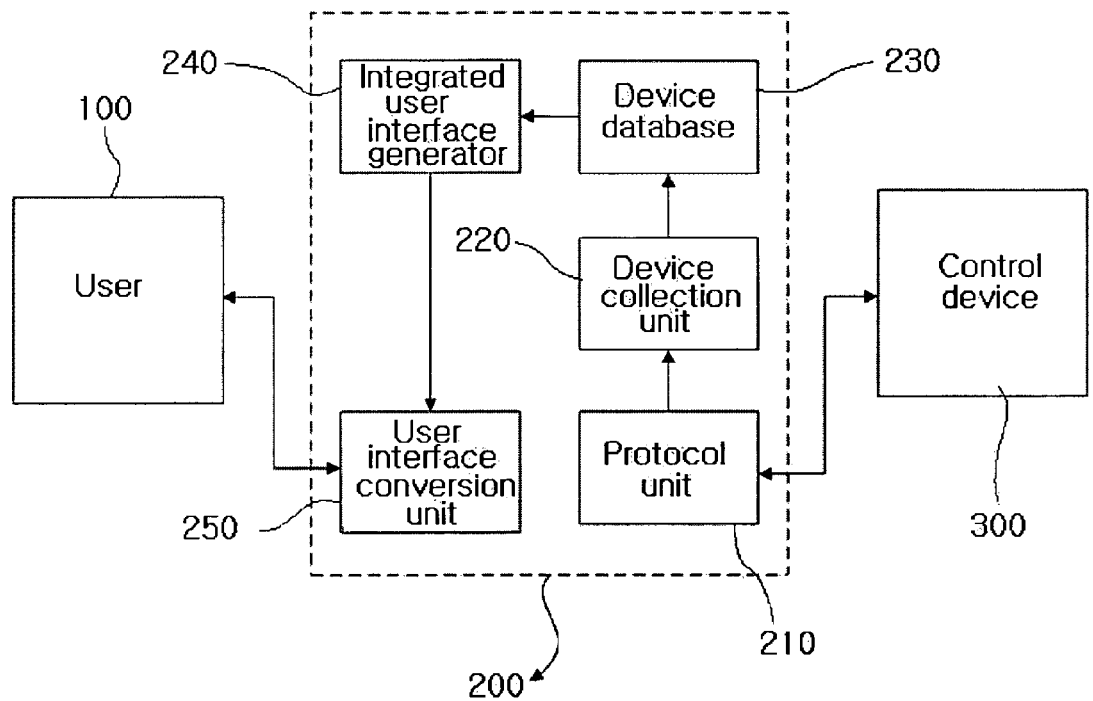
FIG. 1 is a block diagram schematically illustrating a configuration of a user interface conversion system capable of supporting various devices according to the present invention.

FIG. 1 is a block diagram schematically illustrating a user interface conversion system capable of supporting various devices according to the present invention. The user interface conversion system comprises a client of a user 100, a gateway 200, and a control device 300.

The user 100 has access to the control device 300 through the client and controls a home network device. Here, it can be understood that the client of the user 100 is a computer, a notebook computer, a PDA, a mobile phone, or the like.

The gateway 200 generates an integrated user interface (UI), based on neutral UIs for the devices residing on the home network, at the request of the user 100 for controlling the devices and converts the integrated UI into a specific UI so that the integrated UI can be supported in the client of the user 100. The gateway 200 comprises a protocol unit 210, a device collection unit 220, a device database 230, an integrated UI generator 240, and a UI conversion unit 250.

The protocol unit 210 supports a protocol for searching the devices residing on the home network. Here, it can be understood that the protocol is SSDP, lookup service of Jini, or the like.

The device collection unit 220 collects the devices including the neutral UIs residing on the home network.

The device database 230 is configured to store device information collected from the device collection unit 220. Here, the collected device information is meta information on the device, a URL used to access the neutral UI's, or the like.

The integrated UI generator 240 is configured to generate the integrated UI based on the device information stored in the device database 230. That is, the integrated UI neutrally describes the UIs using an XML so that the integrated UI can be converted into one of many specific UI expressions.

The UI conversion unit 250 converts the integrated UI generated from the integrated UI generator 240 into the specific UI that can be supported in the client of the user 100.

The control device 300 is configured to control the operations of the predetermined devices residing on the home network.

Figure 2:
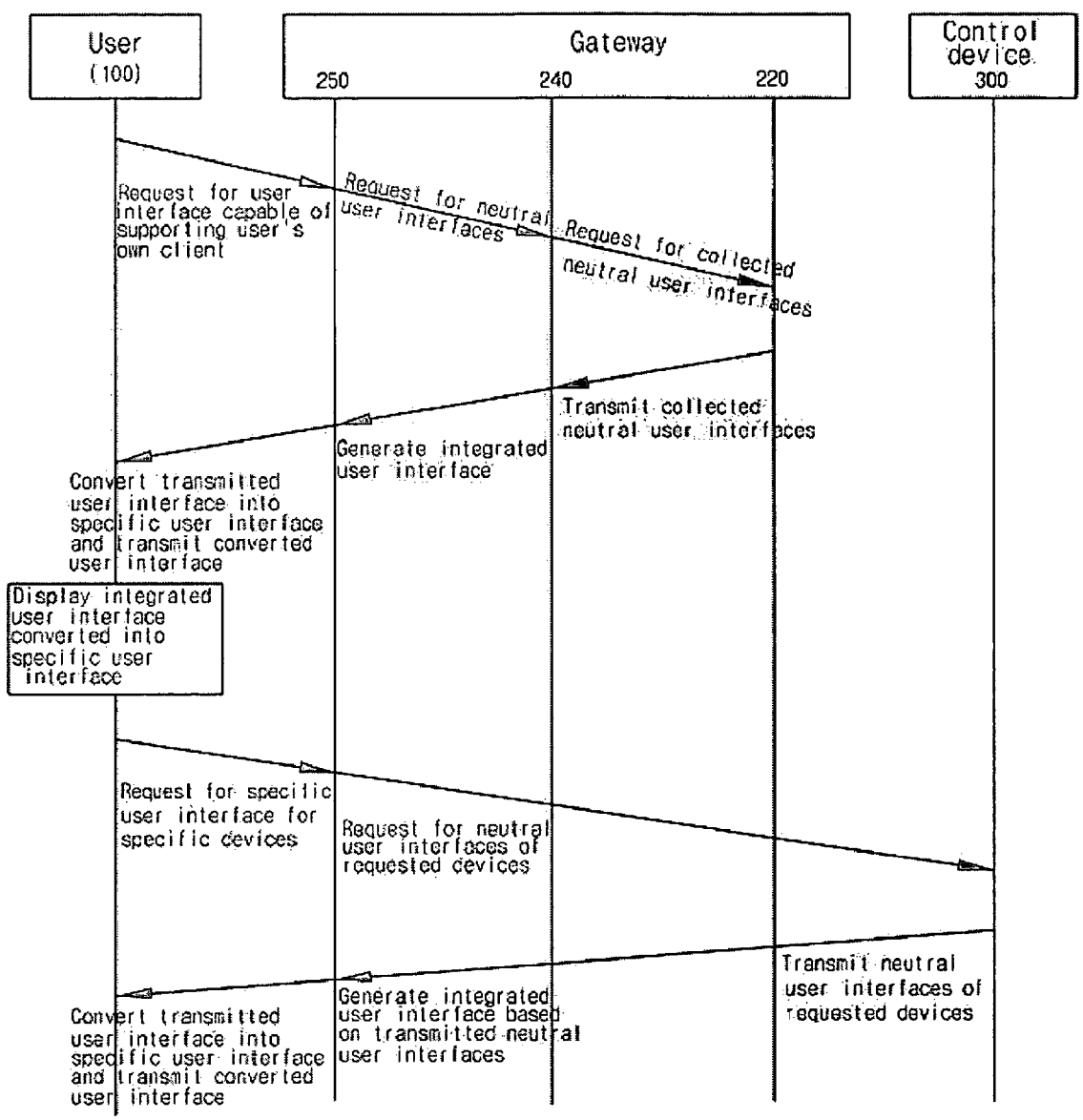
FIG. 2 is a flowchart schematically illustrating a user interface conversion method capable of supporting various devices according to the present invention.
Figure 3:
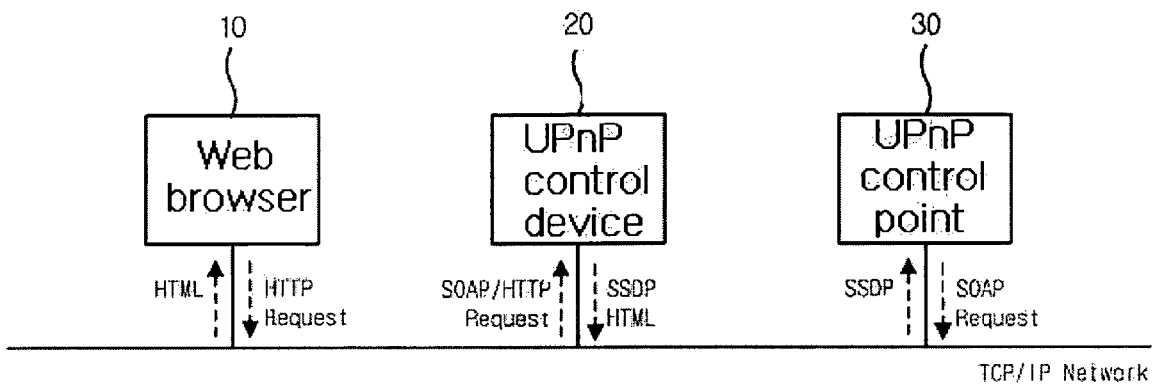
FIG. 3 is a block diagram illustrating an operation control process of allowing the access to control web pages for UPnP control devices within a conventional private network.

FIG. 2 is a flowchart schematically illustrating a user interface conversion method capable of supporting the various devices according to the present invention.

When the user 100 requests the UI conversion unit 250 to transmit the UI for the devices on the home network which can be supported in user's own client, the UI conversion unit 250 first requests the integrated UI generator 240 to transmit the neutral UIs in response to the request of the user 100.

Then, the integrated UI generator 240 requests the device collection unit 220 to transmit the neutral UI's collected in the device collection unit 220, when receiving the request for transmission of the neutral UI's from the UI conversion unit 250. Accordingly, the device collection unit 220 retrieves the collected neutral UI's for the devices that are stored in the device database 230, and then, transmits the retrieved neutral UIs to the integrated UI generator 240.

At this time, the neutral UIs are collected in the device collection unit 220. This is performed in such a manner that the devices residing on the home network are searched through the SSDP and the neutral UI's for the devices are then collected. The device information collected from the device collection unit 220 (for example, the meta information about the devices, the URL information used to have access to the neutral UI's, or the like) is stored in the device database 230. Further, the meta information about the devices (for example, the names of manufacturing companies, types of devices, versions, etc.) and positional information on the neutral UIs are stored in a table format in the device database 230.

In the meantime, the neutral UIs may be collected in the device collection unit 220 either after or before the user 100 makes a request for the UI.

The integrated UI generator 240 generates the integrated UI based on the collected neutral UIs transmitted from the device collection unit 220 and then transmits the generated UI to the UI conversion unit 250. Accordingly, the UI conversion unit 250 converts the integrated UI transmitted from the integrated UI generator 240 into a specific UI that can be supported in the client of the user 100.

Thereafter, when the UI conversion unit 250 transmits the converted specific UI to the client of the user 100, the integrated UI that has been converted into the specific UI is displayed on the client of the user 100. The integrated UI displayed on the client can be expressed in the form of images, texts, or the like. Here, the texts may be expressed in the form of a hyperlink, a text box, a list or the like.

When the user 100 selects (or makes a request for) the UI of a device, which the user wishes to control, from the integrated UI (images or texts) displayed on the client of the user 100, the UI conversion unit 250 requests the control device 300 to transmit the neutral UI for the device that the user 100 has selected (or requested).

Then, the control device 300 transmits the neutral UI for the specific device requested by the UI conversion unit 250 to the UI generator 240 which in turn generates the integrated UI based on the transmitted neutral UI for the device and transmits the generated UI to the UI conversion unit 250.

Thereafter, the UI conversion unit 250 converts the integrated UI transmitted from the integrated UI generator 240 into the specific UI that can be supported in the client of the user 100.

If the integrated UI, which has been converted into the specific UI so that it can be supported in the client of the user 100, is displayed on the client of the user 100, the user 100 can control the operation of the desired device using the integrated UI displayed thereon.

A method of controlling the device residing on the home network by the user according to an exemplary embodiment of the present invention will be hereinafter explained.

First, when the user 100 makes a request for the UI of the device residing on the home network which can be supported in his/her own client, the gateway 200 generates the integrated UI based on the collected neutral UIs and converts the generated UI into the specific UI so that the integrated UI can be supported in the client of the user 100. Then, the gateway 200 causes the converted UI to be displayed on the client of the user 100. Here, the integrated UI converted into the specific UI is supported in the form of the images or texts in the client of the user 100. That is, the home network devices (for example, a refrigerator, TV, audio and the like) controllable by the user 100 are displayed in the form of the images or texts on the client of the user 100.

When the user 100 selects (or makes the request for) the UI of the desired device (e.g., TV) from the integrated UI displayed on the client, the gateway 200 requests the control device 300 to transmit the neutral UI of the device (e.g., TV) selected (or requested) by the user 100.

Then, the control device 300 transmits the requested neutral UI of the device (e.g., TV) to the gateway 200. The gateway 200 generates the integrated UI based on the received neutral UI and converts the generated UI into the specific UI so as to display the specific UI on the client of the user 100.

Thus, the user 100 can control the operation of the specific device (e.g., TV) residing on the home network through the integrated UI (e.g., volume control, channel change, power on/off, etc.) of the specific device (e.g., TV) which is displayed on the client.

Table 1 below is a table showing UI elements for expressing the neutral UIs of the present invention in the form of tags.

In Table 1 below, the tags are classified by double lines according to respective UI elements. In the respective elements, unindented tags are main roots and indented tags represent children elements with respect to the respective above main roots.

TABLE 1

| Tag | Explanation |
| --- | --- |
| Panel | It seems to be a single HTML page because it includes a whole UI. |
| Image | It indicates information in the form of images. If a relevant device cannot support the image, it should be replaced with texts. |
| Information | It corresponds to the information on the image. |
| src | Location where an actual figure will be downloaded, i.e., relative URL |
| text | It is a text displayed on the screen. If a relevant device cannot support the image, it should be replaced with texts. |
| option | It prescribes characteristics used for expressing the information. |
| Label | It indicates text information. |
| information | It corresponds to the information on the label. |
| text | It is a text displayed on the screen. |
| option | It prescribes characteristics used for expressing the information. |
| List | It is a choice element for allowing one menu to be selected from one or more menus. |
| information | It corresponds to the information on the list. |
| id | It has a value for classifying the choice elements. |
| action | URL that will be retrieved at the actual execution |
| itemlist | One or more sets of menus |
| item | Individual menus |
| actionmsg | A value that is input when the user selects |
| value | A value that corresponds to the actionmsg in an item selected by the user and is actually transferred |
| text | It is a text displayed on the screen. |
| option | It prescribes characteristics used for expressing the information. |
| Textbox | It receives strings from the user and executes the given operation. |
| information | It corresponds to the information on the textbox. |
| id | It has a value for classifying the textboxes. |
| text | It is a text displayed on the screen. |
| action | URL that will be retrieved at the actual input execution |
| option | It prescribes characteristics used for expressing the information. |
| Button | It executes the given operation when the UI elements in the form of images or texts are selected. |
| information | It corresponds to the information on the button. |
| src | Location where an actual figure will be downloaded, i.e., relative URL |
| text | It is a text displayed on the screen. If a relevant device cannot support the image, it should be replaced with texts. |
| action | URL that will be retrieved in order to execute the given operation when the image or text elements are selected |
| option | It prescribes characteristics used for expressing the information. |

Panel: It indicates a framework including the whole UI. Thus, all the individual UI elements are included in the panel.

Image: It indicates information in the form of images. It is generally a URL and represents a location where the image is downloaded. Here, the types of images to be supported vary according to user interface displays.

Label: It indicates information in the form of texts.

Textbox: It receives strings from the user and executes the given operation.

Button: It executes the given operation when the UI elements in the form of images or texts are selected.

List: If one menu is selected from several menus, it executes the given operation in response to the selected menu.

Reference FIG. 1 shown below is an example in which the operation control of the home network device is described with the neutral UIs with reference to Table 1.

A process of controlling a washing machine residing on the home network by the user 100 will be hereinafter explained in Table 2.

etc.) and time setting functions are displayed in response to arbitrary selection of the user 100. If the user selects the "boiling washing" function, a UI on which a period of time needed for boiling the laundry can be input is displayed. Thus, the boiling function of the washing machine is performed during the time period inputted by the user 100.

TABLE 2

```
<Panel>
<Image>
        <information>
                <src>./washer.jpg</src>
                <text>WASHER</text>
                <option> . . . </option>
        </information>
</Image>
<Lable>
        <information>
                <text>Select washing mode of washing machine </text>
                <option>...</option>
        </information>
</Lable>
<List>
        <information>
                <id>mode</id>
                <action>./mode.guiml</action>
                <itemlist>
                        <item>
                                <actionmsg>1</actionmsg>
                                <value>1</value>
                                <text>1.Standard washing </text>
                        </item>
                        <item>
                                <actionmsg>2</actionmsg>
                                <value>2</value>
                                <text>2.Quick washing </text>
                        </item>
                        <item>
                                <actionmsg>3</actionmsg>
                                <value>3</value>
                                <text>3.Boiling washing <text>
                        </item>
                </itemlist>
                <option> . . . </option>
        </information>
</List>
<Textbox>
        <information>
                <id>time</id>
                <text>Time :</text>
                <action>./timer.GUIML</action>
                <option> . . . </option>
        </information>
</Textbox>
<Button>
        <information>
                <src>./back.jpg</src>
                <text>BACK<text>
                <action>./main.GUIML</action>
                <option>...</option>
        </information>
<Button>
</Panrl>
```

When the user 100 requests that the washing machine residing on the home network be controlled, the neutral UI in the form of images or texts capable of controlling the washing machine is displayed on the client of the user 100.

If the user 100 selects the displayed washing machine, a UI stating "Select washing mode of the washing machine" is displayed on the client of the user 100 and another UI related to the selected washing mode (e.g., standard mode, quick mode, etc.) is also displayed thereon.

Thereafter, the next individual functions (e.g., boiling washing, spinning, number of rinse, hot/cold water setting, Thereafter, another UI in the form of images or texts, on which the other functions of the washing machine can be selected, is displayed on the client of the user 100.

According to the present invention, the integrated UI is generated based on the neutral UIs of the devices residing on the home network and converted into the specific UI so that it can be supported in the specific client. Thus, there is an advantage in that a variety of clients can be supported.

Further, there is another advantage in that the user can have access to the devices residing on the home network through the integrated UI.

The present invention can be embodied as a computer readable program that can be run by a computer, and implemented in a digital computer using a computer readable recording medium. Here, the computer readable medium may be any recording apparatus including a magnetic storage medium, such as read-only memory (ROM), a floppy disk, and a hard disc, and an optical recording medium, such as CD ROM, and DVD). Also, the computer readable medium may be a carrier wave that transmits data via the Internet, for example.

The present invention has been described in detail in connection with an exemplary embodiment, but it will be apparent to those skilled in the art that various modifications or changes may be made thereto without departing from the spirit and scope of the invention as defined in the appended claims. Therefore, mere modifications to the present invention fall within the scope of the present invention.

What is claimed is:

1. A user interface conversion system comprising a processor which comprises a gateway wherein an integrated user interface is generated based on neutral user interfaces of devices residing on a home network and converted into a specific user interface suitable for a specific client of a user,
   wherein the gateway requests a control device to transmit a neutral user interface selected by the user from the integrated user interface, said user selecting said neutral user interface corresponding to a device which the user desires to control among the devices residing on the home network,
   wherein the control device transmits the selected neutral user interface to the gateway,
   wherein the gateway converts the transmitted neutral user interface into a device specific user interface which is suitable for the specific client of the user,
   wherein the user controls operation of the device using the device specific user interface, and
   wherein the gateway comprises:
      a device collection unit for collecting the devices including the neutral user interfaces residing on the home network;
      a device database for storing information on the devices collected by the device collection unit;
      an integrated user interface generator for generating the integrated user interface based on the information on the devices stored in the device database; and
      a user interface conversion unit for converting the integrated user interface generated from the integrated user interface generator into the specific user interface suitable for the specific client of the user.

2. The system as claimed in claim 1, the gateway further comprising a protocol unit that supports a protocol for searching for a one device residing on the home network.

3. The system as claimed in claim 1, wherein the information on the devices stored in the device database is meta information on the devices and URL information for accessing the neutral user interfaces.

4. The system as claimed in claim 1, wherein the integrated user interface is described with the neutral user interfaces, wherein the integrated user interface is converted into at least the specific user interface of a plurality of specific user interfaces.

5. A user interface conversion system supporting various devices, comprising:
   a control device for controlling predetermined devices residing on a home network; and
   a processor comprising a gateway for generating an integrated user interface based on neutral user interfaces of the devices residing on the home network at the request of a user for controlling the devices and converting the generated integrated user interface into a specific user interface supported in a specific client of the user,
   wherein the gateway requests the control device to transmit a neutral user interface selected by the user from the integrated user interface, said user selecting said neutral user interface corresponding to a device which the user desires to control among the devices residing on the home network,
   wherein the control device transmits the selected neutral user interface to the gateway,
   wherein the gateway converts the transmitted neutral user interface into a device specific user interface which is suitable for the specific client of the user,
   wherein the user controls operation of the device using the device specific user interface, and
   wherein the gateway comprises:
      a device collection unit for collecting the devices including the neutral user interfaces residing on the home network;
      a device database for storing information on the devices collected by the device collection unit;
      an integrated user interface generator for generating the integrated user interface based on the information on the devices stored in the device database; and
      a user interface conversion unit for converting the integrated user interface generated from the integrated user interface generator into the specific user interface suitable for the specific client of the user.

6. A user interface conversion method supporting devices, comprising the steps of:
   collecting the devices that include neutral user interfaces and reside on a home network;
   extracting and storing information about the collected devices;
   generating an integrated user interface based on the stored information about the devices;
   converting the generated user interface into a specific user interface supported in a client of a user;
   requesting a neutral user interface selected by the user from the integrated user interface, said user selecting said neutral user interface corresponding to a device which the user desires to control among the devices residing on the home network;
   receiving the selected neutral user interface; and
   converting the received neutral user interface into a device specific user interface which is suitable for the client of the user, wherein the user controls operation of the device using the device specific user interface.

7. The method as claimed in claim 6, wherein the information about the devices stored in a device database is meta information on the devices and URL information for accessing the neutral user interfaces.

8. The method as claimed in claim 6, wherein the integrated user interface is described with the neutral user interfaces, wherein the integrated user interface is converted into at least the specific user interface of a plurality of specific user interfaces.

9. A user interface conversion method supporting various devices, comprising:
   (a) requesting, by a user, for a user interface supported in a user's own client;
   (b) transmitting neutral user interfaces collected at the request of the user for the user interface;
   (c) generating an integrated user interface based on the transmitted neutral user interfaces;

(d) converting the integrated user interface into a specific user interface supported in the client of the user;

(e) transmitting the converted specific user interface to the client of the user;

(f) displaying the integrated user interface converted into the specific user interface on the client of the user;

(g) selecting a device which is desired to be controlled among devices residing on a home network from the integrated user interface displayed on the client; and (h) controlling operation of the selected device, wherein (g) comprises:

(g1) requesting a neutral user interface of the selected device;

(g2) receiving the neutral user interface of the selected device; and (g3) converting the received neutral user interface into a device specific user interface which is suitable for the client of the user, and wherein (b) further comprises:

requesting an integrated user interface generator to transmit the neutral user interfaces at the request of the user, by a user interface conversion unit:

requesting a device collection unit to transmit the neutral user interfaces collected therein by the integrated user interface generator; and retrieving the neutral user interfaces collected in a device database by the device collection unit.

10. The method as claimed in claim 9, wherein the integrated user interface is described with the neutral user interfaces, wherein the integrated user interface is converted into at least the specific user interface of a plurality of specific user interfaces.

11. A computer-readable recording medium for recording a computer program code for enabling a computer to provide a service of converting interfaces in supporting various devices, the service comprising:

collecting the devices that include neutral user interfaces and reside on a home network;

extracting and storing information about the collected devices;

generating an integrated user interface based on the stored information about the devices;

converting the generated user interface into a specific user interface supported in a client of a user;

requesting a neutral user interface selected by the user from the integrated user interface, said user selecting said neutral user interface corresponding to a device which the user desires to control among the devices residing on the home network;

receiving the selected neutral user interface; and converting the received neutral user interface into a device specific user interface which is suitable for the client of the user, wherein the user controls operation of the device using the device specific user interface.

12. The computer-readable recording medium of claim 11, wherein the information about the devices stored in a device database is meta information on the devices and URL information for accessing the neutral user interfaces.

13. The computer-readable recording medium of claim 11, wherein the integrated user interface is described with the neutral user interfaces, wherein the integrated user interface is converted into at least the specific user interface of a plurality of specific user interfaces.

14. A computer-readable recording medium for recording a computer program code for enabling a computer to provide a service of converting interfaces in supporting various devices, the service comprising:

(a) requesting, by a user, for a user interface supported in a user's own client;

(b) transmitting neutral user interfaces collected at the request of the user for the user interface;

(c) generating an integrated user interface based on the transmitted neutral user interfaces;

(d) converting the integrated user interface into a specific user interface supported in the client of the user;

(e) transmitting the converted specific user interface to the client of the user;

(f) displaying the integrated user interface converted into the specific user interface on the client of the user;

(g) selecting a device which is desired to be controlled among devices residing on a home network from the integrated user interface displayed on the client; and (h) controlling operation of the selected device, wherein (g) comprises:

(g1) requesting a neutral user interface of the selected device;

(g2) receiving the neutral user interface of the selected device; and (g3) converting the received neutral user interface into a device specific user interface which is suitable for the client of the user, and wherein (b) further comprises:

requesting an integrated user interface generator to transmit the neutral user interfaces at the request of the user, by a user interface conversion unit:

requesting a device collection unit to transmit the neutral user interfaces collected therein by the integrated user interface generator; and retrieving the neutral user interfaces collected in a device database by the device collection unit.

15. The computer-readable recording medium of claim 14, wherein the integrated user interface is described with the neutral user interfaces, wherein the integrated user interface is converted into at least the specific user interface of a plurality of specific user interfaces.

16. The system as claimed in claim 1, wherein the specific user interface display text or images representing the devices residing on the home network, based on a capability of the specific client of the user.

17. The system as claimed in claim 16, wherein the capability is computer performance or user interface display capability.

* * * * *